Patented Oct. 3, 1950

2,524,674

UNITED STATES PATENT OFFICE 2,524,674

HETEROCYCLIC NITROGEN COMPOUNDS CONTAINING A FURANE NUCLEUS AND PREPARATION THEREOF

Edmund B. Middleton, Woodbridge, N. J., assignor to E. I. du Pont de Nemours & Company, Wilmington, Del., a corporation of Delaware No Drawing. Application May 15, 1943, Serial No. 487,138

2 Claims. (Cl. 260—240.1)

The invention described below relates to new organic chemical compounds and their preparation and use. More particularly, it relates to new dyestuff intermediates, dyes, and the preparation and use thereof. Still more particularly it relates to cyanine dyestuff intermediates and cyanine dyestuffs and to photographic emulsion layers and elements containing the novel cyanine dyestuffs and to their preparation and manufacture.

It is an object of this invention to provide new organic chemical intermediates. A more specific object is to provide new dyestuff intermediates. A further object is to provide a new group of photographic sensitizing dyes. A still further object is to provide a group of cyanine type sensitizing dyes which increase over-all sensitivity and confer a useful range of extra sensitivity to silver halide emulsions. A still further object is to provide emulsions which contain sensitizing dyes which are compatible with immobile color formers. Other objects will be apparent from the following detailed description of the invention.

It has been found that 2-methyl thiazoles which have attached to the 4-position a furyl nucleus and which may be substituted in the 5-position may be prepared and constitute useful organic intermediates, particularly dye intermediates. They may be converted into cycloammonium or quaternary salts by reaction with a salt forming agent. By reason of the reactive methyl group in the alpha position to the heterocyclic nitrogen atom, they can be condensed to form cyanine dyes of utility as commercially practical sensitizing dyes.

The novel dye intermediates of this invention in the base form have the general formula:

(1) 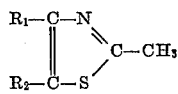

wherein $R_1$ is a furane nucleus which is attached to the 4-position of the thiazole ring in the alpha position to the oxygen atom of the furane nucleus; $R_2$ is a furane nucleus similar to $R_1$ or a hydrogen atom, hydrocarbon radical or carbalkoxy group.

The compounds of Formula 1 can be prepared by reacting a furyl ketone having an acyclic carbon atom with at least 2 hydrogen atoms directly attached to the carbonyl group with a brominating agent and reacting the alpha bromo ketone derivative formed with thioacetamide.

The reactions may be illustrated by the following equations:

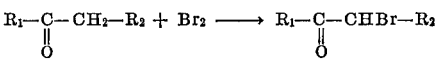

and

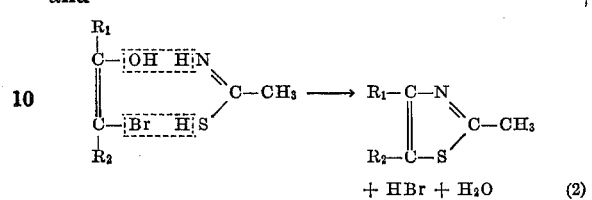

$$+ \text{HBr} + \text{H}_2\text{O} \qquad (2)$$

In the above formulae $R_1$ is a furane nucleus which is joined to the rest of the compound in question through an alpha carbon atom of such nucleus. $R_1$ is not limited to a monocyclic nucleus but includes, in addition to an unsubstituted furane nucleus, substituted furyl radicals including those containing a fused-on radical such as a benzofuryl, naphthofuryl anthracenofuryl radical. $R_2$ is hydrogen, a hydrocarbon radical, carbethoxy, or is the same as $R_1$.

The thiazoles of Formula 2 can be converted into cycloammonium salts in a simple manner by reacting them with a quaternizing or salt-forming agent such as an alkyl salt or an ester of an alcohol radical and a suitable acid such as an alkyl halide, nitrate, perchlorate, p-toluene sulfonate, and sulfamate, etc. The cycloammonium salts have the general formula:

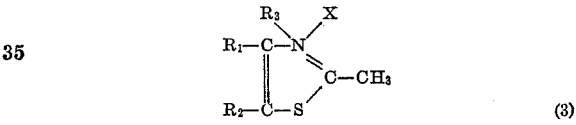

(3)

wherein $R_1$ and $R_2$ have the same significance as in Formulas 1 and 2. $R_3$ is an aliphatic hydrocarbon radical and X is the negative radical of an acid.

The compounds of Formula 3 in accordance with one aspect of this invention, may be converted into cyanine type dyes by a condensation reaction, in a manner similar to that by which the quaternary salts of alpha-methylthiazoles, e. g., alpha-methylbenzthiazoles, alpha-methylnaphthiazoles, etc., are converted into cyanine dyestuffs. Both symmetrical and unsymmetrical dyes can be prepared. If one mol of a quaternary salt of a known heterocyclic base containing a reactive group of the type used in the preparation of cyanine dyes is used per mol of Formula 3 salt unsymmetrical dyes may be formed. If the condensations are effected with the use of a beta ethoxyacroleinacetals, penta-methinecyanines are formed.

To be more specific, cyanine dyes of the unsymmetrical type which are bridged by a methenyl radical (—CH=) may be prepared by reacting a compound of Formula 3 with a heterocyclic nitrogen salt of the type used in cyanine dyes having a reactive methyl or a reactive thioether group in an alpha or gamma position to a heterocyclic nitrogen atom. Such compounds include the quaternary salts of the unsubstituted thioethers or alpha or gamma methyl thiazoles, thiazolines, oxazoles, or azolines, selenazoles, selenazalines, pyridines, quinolines, indolenines, dialkylindolenines, e. g. dimethyl- and diethylindolemines, and iminazoles, including the corresponding polycyclic compounds such as benzthiazoles, naphthiazoles, and anthrathiazoles.

When ortha esters are used in the condensations to make trimethine cyanines, they may be of aliphatic or aromatic carboxylic acids. The ortho esters of the acids result in carbocyanine dyes which comprise two heterocyclic nitrogen nuclei bridged by a trimethenyl radical —CH=CH—CH= or by a substituted trimethenyl radical of the formula:

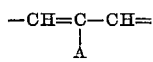

wherein A is a hydrocarbon radical. In the case of aliphatic carboxylic acids having more than 1 carbon atom in the molecule, R becomes an alkyl radical. When an ortho ester of an aromatic carboxylic acid is used, A is an aryl radical. When ortho formate esters are used A is hydrogen. However, neocyanine type dyes may also be formed wherein A is a furylthiazole dimethenyl radical.

The dyes produced may be added to a photographic emulsion or layer and confer valuable sensitizing properties thereto. They may be brought into intimate contact with the silver halide grains thereof by dispersing the compounds in the silver halide coating compositions or emulsions before coating to form photosensitive layers or subsequently by bathing or impregnating the layer with the dyes. It is convenient to add the dyes to the emulsions from a solution in a solvent which is compatible with the emulsion, free from deleterious action on the light sensitive material and capable of dissolving the dyes. Methanol, ethanol, and acetone are suitable solvents.

The concentration of the dyes in the emulsions can vary widely, e. g., from about 2 to 100 mg. per liter of ordinary flowable gelatino-silver-halide emulsion. The concentration of dye will vary according to the type of light sensitive materials employed in the emulsion and according to the effects desired. The suitable and most economical concentration for any given emulsion will be apparent to those skilled in the art, upon making ordinary tests and observations customarily employed in the art of emulsion making. To prepare a gelatino-silver-halide emulsion, the following procedure is satisfactory: A quantity of the dye is dissolved in methyl alcohol or acetone and a volume of this solution (which may be diluted with water) containing from 2 to 100 mg. of dye is slowly added to 1000 cc. of a flowable gelatino-silver-halide emulsion with stirring. Stirring is continued until the dye is thoroughly incorporated in the emulsion. Ordinarily from 10 to 20 mgs. of the dyes per liter of emulsion suffice to produce the maximum effect.

The invention will be further illustrated but is not intended to be limited by the following examples wherein the parts stated are parts by weight:

*Example I*

Ten parts of furyl methyl ketone prepared according to the process of Sandelin, Ber. (33) p. 492 were dissolved in about 100 parts of carbon disulfide and treated with 15 parts of bromine dissolved in a small amount of carbon disulfide. The bromine solution was added drop by drop while a current of $CO_2$ was passed through the solution. This served to stir the solution and sweep out the HBr which was formed. The carbon disulfide was then evaporated, the residue was dissolved in about 45 parts of warm alcohol and treated with small portions of thioacetamide until 7 parts had been added. The solution was refluxed for 1 hour and a large part of the alcohol then removed by evaporation. A small quantity of water was added and the solution made alkaline with sodium carbonate. An oil separated which was taken up in ether. The ether was dried over anhydrous potassium carbonate and the ether removed by evaporation. The residue was distilled under a reduced pressure of 15 mm. of mercury, the product boiling between 120° and 130° C. Approximately ten parts of a pale yellow oil was obtained thought to have the following formula:

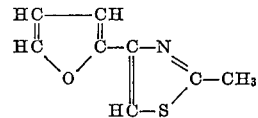

This product was converted to the alkyl salt by treatment with 10 parts of ethyl p-toluenesulfonate.

*Example II*

Eight parts of 2-methyl-4-furylthiazole ethyl p-toluene-sulfonate and 10 parts of ethyl-orthoformate were dissolved in 44 parts of dry pyridine. The solution was heated to reflux for 30 minutes. On cooling the dye separated as green crystals which were washed with ether and recrystallized from a mixture of alcohol and ether. A yield of 1.97 parts of the desired substance was obtained. It was thought to have the following probable formula:

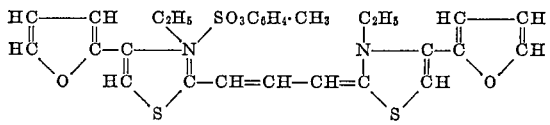

a. Thirty milligrams of this dye dissolved in 90 cc. of alcohol were added to 1 liter of a gelatino-silver bromide emulsion containing approximately 57 grams of mixed silver halides (97% silver bromide and 3% silver iodide) and 88 grams of gelatin per liter. The sensitivity of the emulsion was extended to 6300 Å. with a maximum at 6000 Å.

b. Thirty milligrams of the above dye were added to a liter of a gelatino-silver chloride emulsion containing 70 grams mixed silver halides (97% silver chloride and 3% silver bromide) and 50 grams of gelatin. The dye extended the sensitivity of the emulsion to 7100 Å. with a maximum at 6200 Å.

c. The above dye was converted to the ethiodide by treating an alcoholic solution thereof with hot, saturated, aqueous, potassium iodide solution. Thirty-milligrams added to a liter of the emulsion described in (a) extended the sensitivity to 6400 Å. with a flat maximum from 5300 Å. to 6200 Å. When the same quantity was added to a liter of the emulsion described in (b) it extended the sensitivity to 6800 Å. with a maximum at 6400 Å.

*Example III*

Eight parts of 2-methyl-4-furylthiazole ethyl-p-toluene-sulfonate and 10 parts of ethyl-orthoacetate were dissolved in 44 parts of dry pyridine. The solution was heated to reflux for 30 minutes. On cooling, dark-colored crystals separated out, which were washed in ether and then purified by recrystallization from a mixture of alcohol and ether. It was converted to the ethiodide as described in Example II. A yield of 0.76 part of a dye having the following probable formula was obtained:

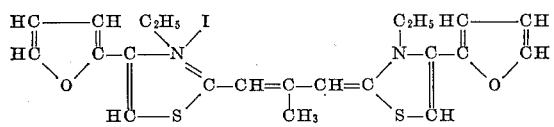

When 30 milligrams of the dye were added to a liter of the emulsion described in IIb it extended the sensitivity to 6600 Å. with a maximum at 6000 Å.

*Example IV*

By substituting 10 parts of ethyl-ortho-propionate in the process described in Example III a dye was obtained believed to have the following formula:

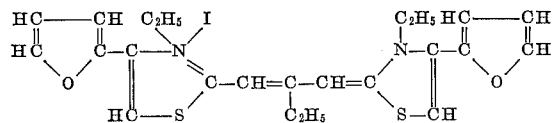

When 30 milligrams were added to a liter of the emulsion described in IIb the sensitivity was extended to 6500 Å. with a flat maximum from 5600 Å. to 5800 Å.

*Example V*

Seven and eighty-five hundredths parts of 2-methyl-4-furylthiazole-p-toluene-sulfonate and 10 parts of 2-anilidovinyl beta-naphthiazole ethiodide were dissolved in 87.3 parts of dry pyridine. The solution was heated to reflux for 30 minutes during which time a purple color developed and a dye crystallized out of the hot solution. The crystals were removed by filtration, washed with ether and recrystallized from alcohol. One and seventy-five hundredths parts of bright green crystals were obtained with following probable formula:

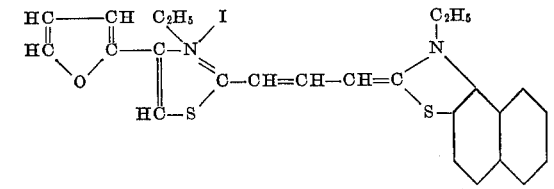

Thirty milligrams of this dye were added to a liter of the emulsion described in IIa. The sensitivity was extended to 6900 Å. with a maximum at 6400 Å. The same quantity of dye added to a liter of the emulsion described in IIb extended the sensitivity to 7000 Å. with a maximum at 6500 Å.

*Example VI*

Ten parts of 2-anilido vinyl alpha-naphthiazole were substituted for the beta-naphthiazole described in Example V. Two and eighteen hundredths parts of green crystals were obtained thought to have the following formula:

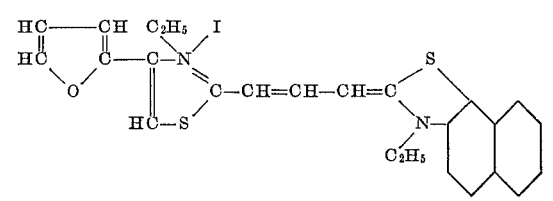

When 30 milligrams of this dye were dissolved in 90 cc. of alcohol and added to 1 liter of the emulsion described in IIa above the sensitivity was extended to 6600 Å. with a maximum at 6200 Å. The same quantity of dye added to the emulsion described in Example IIb sensitized the emulsion to 6800 Å. with a maximum at 6200 Å.

*Example VII*

A molecular equivalent of 2-anilido-vinyl benzthiazole ethiodide was substituted for the 2-anilido-beta-naphthiazole ethiodide in the process of Example V. Three and nine-tenths parts of purple crystals were obtained thought to correspond to the following formula:

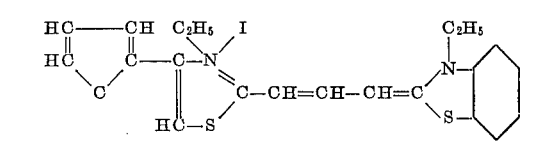

Thirty milligrams of this dye added to 1 liter of a silver bromide emulsion similar to that described in Example IIa extended the sensitivity to 6500 Å. with a maximum at 6000 Å. The same quantity of dye added to 1 liter of a silver chloride emulsion similar to that used in IIb sensitized the emulsion to 6600 Å. with a maximum at 6000 Å.

*Example VIII*

A dye was prepared according to the process of Example V substituting an equivalent quantity of 2-anilido-vinyl-alpha-naphthoselenazole diethyl sulfate for the naphthiazole used therein. The dye formed was converted to the iodide by treating the ethyl ethsulfate in pyridine solution with aqueous potassium iodide solution. Two and eighteen hundredths parts of green crystals were obtained thought to have the following formula:

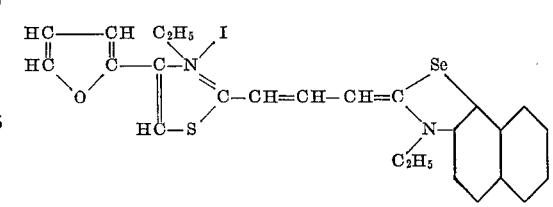

Thirty milligrams of this dye added to 1 liter of a silver bromide emulsion similar to that employed in Example IIa gave green-blind sensitization extending from 4000 Å. to 6900 Å. with a gap between 5100 Å. and 5800 Å. and maxima at 4700 Å. and 6700 Å. When a similar quantity of dye was added to a silver chloride emulsion similar to that described in Example IIb it produced green-blind sensitization from 3800 Å. and 6900 Å. with a gap between 4600 Å. and 5600 Å. and maxima at 4300 Å. and 6600 Å.

*Example IX*

Four parts of 2 methyl-4-furyl-thiazole-ethyl-p-toluene sulfonate and 4 parts of 2-methyl-mercapto - quinoline - ethyl-p-toluene-sulfonate were dissolved in 17 parts of absolute alcohol together with 1 part of triethylamine. The solution was heated to reflux for 1 minute and cooled. The dye was precipitated with ether, and purified by recrystallization from alcohol. About 3 parts of red crystals with a gold reflex were obtained. The compound was believed to have the following formula:

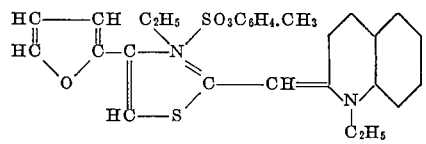

When 30 milligrams of the above dye were placed in a liter of the emulsion described in IIa, the sensitivity was extended to 5800 Å. wth a maximum at 5400 Å. The same quantity of dye added to a liter of the emulsion described in Example IIb extended the sensitivity to 5500 Å. with a maximum at 5300 Å.

*Example X*

Five and six-tenths parts of 2-methyl-mercapto-6-methoxy quinoline and 4.2 parts of diethyl sulfate were heated together on an oil bath at 140° C. for 3 hours. The product was allowed to cool, dissolved in a small amount of alcohol and ten parts of 2-methyl-4-furyl-thiazole ethyl-p-toluene sulfonate and 2.8 parts of triethylamine added to the resulting solution. The solution was heated to reflux until an orange color formed and the heating continued for several minutes thereafter. Saturated potassium iodide solution was then added and the product removed from the liquid and recrystallized three times from alcohol. Two and seven-tenths parts of dark orange-red crystals were obtained thought to correspond to the following formula:

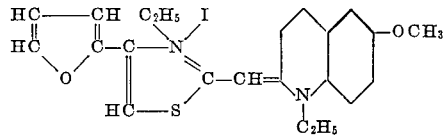

*Example XI*

Four parts of 2-acetyl-coumarone (prepared according to Stoerner: Ber. (30) 1711) were dissolved in 20 parts of carbon disulfide and treated with 4 parts of bromine dissolved in 20 parts of carbon disulfide. The bromine solution was added drop by drop while a current of $CO_2$ was passed through the solution to help stir the solution and sweep out the HBr which was formed. After the addition was completed, the solution was allowed to stand for 30 minutes and then the HBr and $CS_2$ were removed by distillation. Two hundred ccs. of absolute alcohol were added and the solution warmed to reflux. At this temperature, small portions of thio-acetamide were added until two parts of this material had been introduced into the reaction vessel. After the reaction appeared to be completed, the large portion of the alcohol was removed by distillation and three volumes of water were added to the residuum. The solution was made alkaline with sodium carbonate whereupon an oil separated that was taken up in ether. The ether extract was dried over anhydrous potassium carbonate and the ether evaporated. The crystalline residue was dissolved in alcohol, purified with charcoal and recrystallized. Three and four-tenths parts of sparkling yellow crystals were obtained thought to have the following formula:

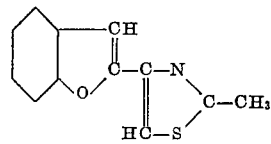

*Example XII*

Two and seven hundredths parts of 2-methyl-4-benzofuryl thiazole and 1.00 part of ethyl p-toluene sulfonate were heated together for 6 hours at 130°–140°. After cooling, 10 parts of dry pyridine and 2.5 parts of ethyl-ortho-formate were added and the whole mixture heated to reflux for 30 minutes. The hot solution was then treated with saturated, aqueous potassium iodide solution whereupon crystallization took place. Fractional crystallization of the product produced a more soluble fraction having a magenta color. This was crystallized twice, producing dark green crystals believed to have the following formula:

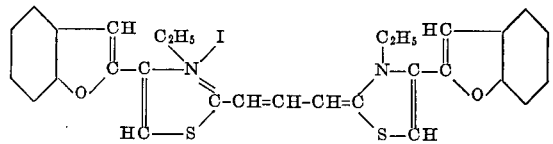

Thirty milligrams of this dye added to a liter of the bromide emulsion described in Example IIa extended the sensitivity strongly to 6600 Å with a maximum at 6200 Å. Forty-five milligrams of the dye in a liter of the silver chloride emulsion described in Example IIb gave similar sensitization.

The least soluble fraction obtained by fractional crystallization was recrystallized twice from alcohol. Dark purple crystals were obtained thought to have the following formula:

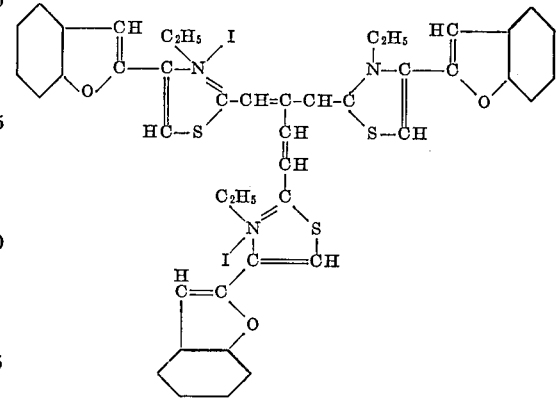

*Example XIII*

Ten parts of 2-methyl-4-benzofuryl thiazole ethiodide were mixed with 50 parts of absolute alcohol together with 8 parts of 2-methyl-mercapto-quinoline ethyl p-toluene sulfonate and 5 parts of triethylamine. The mixture was heated to reflux for approximately two minutes and then cooled. Bright orange crystals were precipitated.

These were filtered off, washed with water and with ether and then recrystallized twice from alcohol. About 2.5 parts of dye were obtained believed to correspond to the following formula:

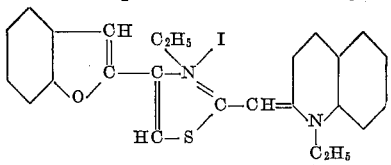

The dye was tested in a silver bromide emulsion as described in Example IIa. The dye sensitized to 5800 Å. with a maximum at 5400 Å. When tested as described in Example IIb, the dye sensitized a silver chloride emulsion to 5800 Å. with a strong maximum at 5500 Å.

*Example XIV*

The process of the preceding example was repeated, substituting an equivalent quantity of the salt derived from 2-methyl-mercapto-6-methoxy quinoline and diethyl sulfate for the quinoline salt employed therein. Orange-red crystals were obtained thought to correspond to the following formula:

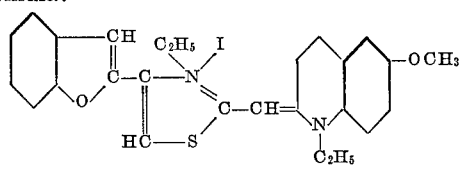

*Example XV*

Ten parts of 2-methyl-4-benzofuryl thiazole and 9.3 parts of ethyl p-toluene sulfonate were heated together for 4 hours at 140–150° C. Twenty parts of 2-methyl-mercapto-6-methyl quinoline ethiodide were added to the resulting product along with a small quantity of alcohol and 4.65 parts of triethylamine. The mixture was heated to reflux until an orange color formed and a dye crystallized from solution. The dye was removed from solution, washed with water and recrystallized twice from alcohol. A product was obtained believed to have the following formula:

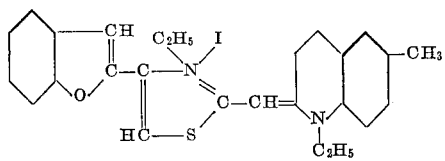

*Example XVI*

Nine parts of 2-methyl-4-benzofuryl thiazole ethiodide are mixed with ten parts of 2-anilido-vinyl-benzothiazole ethiodide and 150 parts of dry pyridine. The mixture was refluxed for 20 minutes and then cooled, crystals separating from the solution on standing. The crystalline product was recrystallized twice from alcohol. Approximately 5 parts of purple crystals were obtained thought to have the following formula:

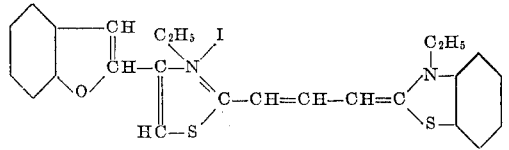

When tested as described in Example IIa the dye sensitized a bromide emulsion to 6600 Å. with a maximum at 6200 Å. When tested in a chloride emulsion as set forth in Example IIb the dye sensitized the emulsion from 4600 Å. to 6600 Å. with a maximum at 6100 Å.

*Example XVII*

The process of Example XVI was repeated substituting an equivalent quantity of 2-anilido-vinyl-benzoselenazole ethyl iodide for the 2-anilido-vinyl-benzothiazole ethiodide employed therein. About 2 parts of dark green crystals were obtained thought to correspond to the following formula:

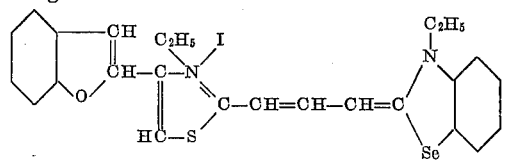

The dye extended the sensitivity of a silver bromide emulsion as described in Example IIa to 6500 Å. The sensitivity of a chloride emulsion such as described in Example IIb was extended to 6700 Å. with a maximum at 6200 Å.

*Example XVIII*

Example XVI was repeated substituting an equivalent quantity of 2-anilido-vinyl-alpha-naphthothiazole ethiodide for the benzothiazole compound thereof. About 3.5 parts of golden brown crystals were obtained believed to have the following formula:

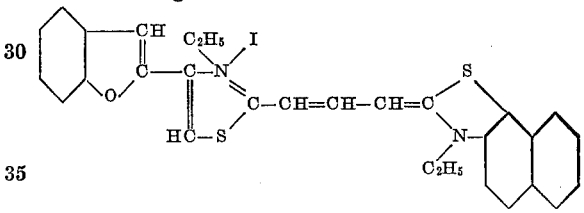

The dye extended the sensitivity of the silver bromide emulsion described in Example IIa to 6600 Å. with maxima at 4700 Å. and 6300 Å. In a silver chloride emulsion prepared as set forth in Example IIb, the dye extends the sensitivity to 6700 Å. with a maximum at 6300 Å.

*Example XIX*

A dye was prepared in similar fashion to the dye of Example XVI, substituting an equivalent quantity of 2-anilido-vinyl quinoline ethyl iodide for the benzothiazole compound employed therein. Four and five tenths parts of grayish black dye crystals were obtained having the following probable formula:

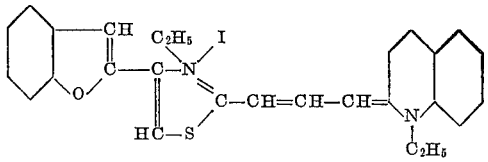

Tested in a silver bromide emulsion as described in Example IIa, the dye extended the sensitivity to 6900 Å. with a maximum at 6400 Å. In a silver chloride emulsion such as described in Example IIb, the dye sensitized from 4800 Å. to 6900 Å. with a maximum at 6400 Å.

*Example XX*

Ten parts of 2-methyl-4-furyl thiazole ethyl p-toluene sulfonate and 3.6 parts of alpha-chlor-beta-anilino acrolein anil were mixed with 44 parts of absolute alcohol and 5.6 parts of triethylamine. The mixture was heated to reflux for 5 minutes and the mixture was then treated with a saturated aqueous solution of potassium iodide. The dye was precipitated in the form of sparkling green crystals which were washed with water and acetone and recrystallized twice from alcohol. A yield of approximately 1 part of a compound thought to have the following formula was obtained:

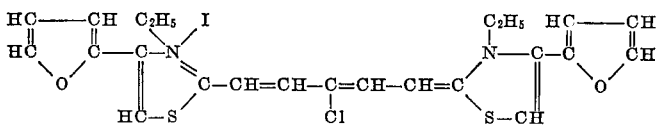

Thirty milligrams of the above dye added to 1 liter of a silver iodo-bromide emulsion containing approximately 60 grams of mixed silver halides (94% AgBr and 6% AgI) and 90 grams of gelatin extended the sensitivity of the emulsion to 7400 Å. with a maximum at 7000 Å. When tested as described in Example IIb, the dye sensitized a silver chloride emulsion strongly to 6800 Å. with a maximum at 6300 Å.

*Example XXI*

Ten parts of 2-methyl-4-furyl thiazole ethyl-p-toluene sulfonate, 3.9 parts of pentadiene dianil hydrochloride, 44 parts of absolute alcohol and 5.6 parts of triethylamine were reacted according to the process described in Example XVI. Three parts of green crystals were obtained, with the following probable formula:

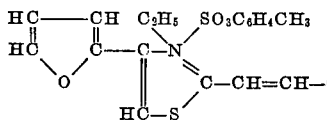

When tested in a concentration of 0.73 milligram/liter in a gelatino silver halide emulsion as described in Example XX, the dye extended the sensitivity of the emulsion to 8500 Å. with a maximum at 8200 Å.

*Example XXII*

Ten parts of 2-methyl-4-benzofuryl thiazole and 9.3 parts of ethyl-p-toluene sulfonate were heated together for 3 hours at 140° C. The product was then mixed with a small quantity of absolute alcohol, 6.5 parts of pentadiene dianil hydrochloride and 7 parts of triethylamine. The mixture was heated to reflux until a purple blue color formed. The solution was then cooled to crystallize the dye which was removed from solution washed with cold alcohol and then recrystallized twice from hot alcohol. The product gives a blue-green solution in alcohol and crystallizes to form green crystals thought to have the following formula:

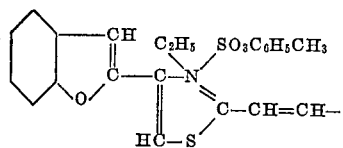

*Example XXIII*

Ten parts of furoyl acetic ester were dissolved in about 142 parts of carbon disulfide and treated dropwise with a solution of about 8.8 parts of bromine in a similar quantity of carbon disulfide. The bromide solution was added while a current of carbon dioxide was passed through the mixture to stir the solution and sweep out the HBr which was formed. The carbon disulfide was removed by evaporation and the residue dissolved in 100 parts of alcohol and 4.1 parts of thioacetamide added dropwise. The mixture was heated to reflux for 30 minutes after which the alcohol was removed by evaporation. Cracked ice was added to the reaction vessel, and the solution made faintly alkaline with sodium carbonate. The mixture was extracted with ether and dried over anhydrous potassium carbonate. The sodium carbonate was then removed by filtration, the residue on the filter being washed with ether. The ether washings were added to the filtrate and the ether evaporated from the combined portions. The residue was then vacuum distilled, 2.75 parts of a pale yellow oil being obtained having a boiling point of 145-150° at 20 mm. pressure. The product was believed to be 2-methyl-4-furyl-5-carbethoxy thiazole having the following probable formula:

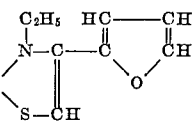

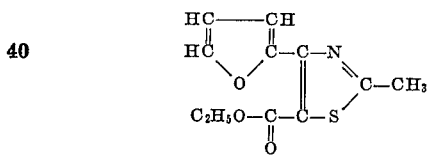

*Example XXIV*

Ten parts of 2-methyl-4-furyl-5-carbethoxy thiazole and 5.25 parts of dimethyl sulfate were mixed together and heated at 130° C. on an oil bath until a green color was formed. The product was then mixed with 53.5 parts of ethyl alcohol, 11.4 parts of 2-methyl-mercapto-quinoline ethbromide and 4.2 parts of triethylamine. The mixture was heated to reflux for 5 minutes. An orange color was formed and crystals separated from the solution on cooling. The crystals were removed by filtration, washed with water and recrystallized several times from alcohol and ether. The product was obtained in the form of orange crystals with the following probable formula:

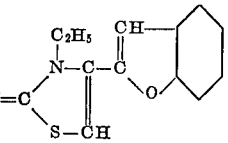

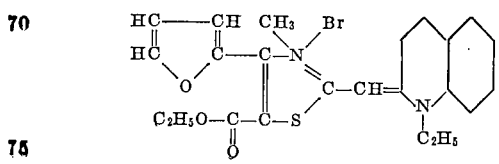

Example XXV

Ten parts of 2-methyl-4-furyl-5-carbethoxy thiazole and 5.25 parts of dimethyl sulfate were mixed together and heated at 130° on an oil bath until the mixture turned light green. The product was then mixed with 61 parts of dry pyridine and 11.25 parts of ethyl-ortho-formate. The mixture was heated to reflux for 15 minutes, cooled and treated with an excess of saturated potassium iodide solution. Crystals were formed which were removed from solution by filtration, recrystallized from alcohol and dried. A small quantity of sparkling green crystals were obtained thought to correspond to the following formula:

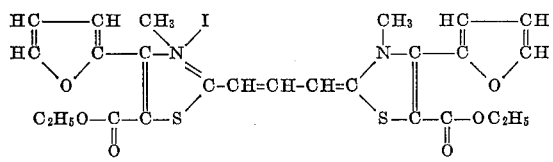

Example XXVI

Ten parts of benzofurylacetic ester (prepared by reacting the sodium salt of salicylaldehyde with gamma-brom aceto acetic ester) were mixed with 63 parts of carbon disulfide. The mixture was cooled with stirring and a solution of 7 parts of bromine in 63 parts of carbon disulfide added dropwise thereto. After the addition of the bromine solution was completed, the carbon disulfide was removed by evaporation and the residue dissolved in 97.5 parts of absolute ethanol. The solution was heated to reflux and 3.25 parts of thioacetamide added dropwise with stirring. After reaction has ceased the alcohol was removed by evaporation and the residue washed with dilute sodium carbonate solution. Sparkling yellow crystals were obtained thought to correspond to the following formula:

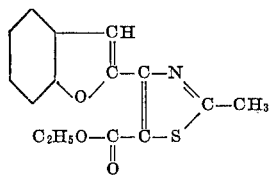

The invention is obviously not limited to the specific heterocyclic nuclei substituents described in the above examples for cyclo ammonium salts substituted by heterocyclic containing 3 rings may be employed. For instance, thiazoles substituted by beta, beta-naphthofuran, beta, beta-isonaphthofuran, alpha-naphthofuran alpha, beta-isonaphthofuran and beta-naphthofuran residues may be prepared and dye condensed in like manner.

In the examples given above thiazoles substituted in the 4 position with a heterocyclic group and in the 5 position with a carbethoxy group are described. By selecting the particular heterocyclic substituted ketone it is possible to prepare thiazoles having a wide variety of substituents entered in both the 4 and 5 positions. For example, by reacting furyl ethyl ketone with bromine and then with thioacetamide a product of the following formula may be obtained:

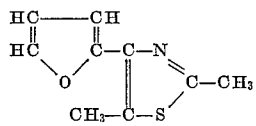

By reacting desoxy furoin with bromine and then with thioacetamide (see Beilstein, vol. XIX, 136 (1934)) a product of the following formula may be obtained:

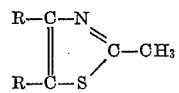

wherein R is an alpha furane radical.

The above described bases which contain a reactive methyl group in the alpha position to the thiazole nuclei can be converted to novel quaternary salts by reaction with a quaternary salt forming compound containing an acid radical and a hydrocarbon radical. They may be prepared for example by reacting the base with a suitable ester e. g. an alkyl, hydroxy-alkyl or aralkyl ester of a suitable anion for example halogen, sulfate, nitrate, perchlorate, p-toluene sulfonate, etc. Any of said or equivalent salts can be employed in the dye condensation reactions described. The salts may be made prior to dye condensation or simultaneously therewith.

The new quaternary cyclammonium salts of the present invention can be employed in the preparation of unsymmetrical simple cyanine dyes by condensing said salts in the presence of a basic condensing agent such as a trialkylamine, sodium acetate, sodium ethylate, sodium carbonate, triethanolamine or n-methyl piperidine with a suitable alkyl or arylmercapto compound such as 1-methyl or 1-ethyl-mercapto quinoline, -benzothiazole, -benzoxazole, -benzselenazole, -naphthiazole, -naphthoxazole compound, etc.

Isocyanine dyes can be prepared by reacting the salts of the present invention with quinoline quaternary salts in the presence of a basic condensing agent. In such dyes the linkage is through the 4-position of the quinoline ring.

Dicarbocyanine dyes unsubstituted in the methine chain can be prepared from the new quaternary salts by condensing them with a compound of the following general formula:

$$R\text{—}N=CH\text{—}CH=CH\text{—}NHR \cdot HX$$

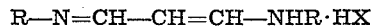

where R is an aryl group and X is an acid radical. Hydrohalides of B-anilinoacrolein anil are particularly useful. The condensation reactions may be carried out in the proportion of two molecules of quaternary salt to one molecule of anil in the presence of basic condensing agents. Unsymmetrical dyes are obtained by varying the types of quaternary salts employed, e. g. by using one mol of one of the new salts of this invention and one mol of a different quaternary salt having a reactive methyl group.

Tetracarbocyanine dyes may be obtained by condensing the new quaternary salts alone or with other known cyclammonium compounds by reacting them with 4-acetoxy or benzoxy-delta-3, 5-heptadiene-1, 7-dial - di - tetraquinolide acid salts. Pentacarbocyanines may be obtained in similar reactions employing 4-acetoxy or benzoxy-delta-3, 5,7-nonatriene-1,9 - dial ditetrahydroquinolide acid salts. The mentioned intermediates are described in Berichte der Deutschen Chemischen Gesellschaft (67) 1274 (1934).

The above types of cyanine dye condensations may be readily employed to give unsymmetrical dyes by condensing one or more molecular equivalents of an intermediate of the invention with one or more molecular equivalents of some other heterocyclic nitrogen compound such as is commonly employed in cyanine dye reactions. More specifically, the alpha methyl substitutents of alpha and beta thionaphthenothiazoles may be used in cyanine condensations in company with any heterocyclic base of the following general formula:

where A represents a reactive group capable of entering into cyanine dye condensations, wherein Y represents the non-metallic atoms necessary to complete a 5-membered heterocyclic nucleus, for example, a 5-membered heterocyclic nucleus containing two nuclear non-metallic atoms other than carbon, one of which non-metallic atoms is trivalent nitrogen and the other a divalent non-metallic atom such as oxygen, sulfur, selenium, etc. By heterocyclic nucleus it is intended to include both substituted and unsubstituted heterocyclic rings described, for example: thiazoles, benzthiazoles, benzoxazoles, naphthiazoles, iminazoles, dialkylindolenines, anthracenothiazoles, etc. Y may also represent the non-metallic atoms necessary to complete a six-membered heterocyclic nucleus such as six-membered heterocyclic nucleus containing but one nuclear non-metallic atom other than carbon as for example, pyridine, quinoline, or naphthquinoline.

Heterocyclic compounds capable of reacting to form merocyanine dyes may be reacted with the dye intermediates of the present invention to form a new class of merocyanine dyes containing a furyl thiazole nucleus.

To be more specific the novel dye intermediates in salt form may be condensed with a compound of the formula:

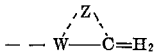

wherein W is either =C=S, =C=Se, =C=Te, or =C—O and Z represents the non-metallic atoms necessary to complete a 5-membered heterocyclic nucleus containing two nuclear non-metallic atoms other than carbon, at least one of which is trivalent nitrogen and another of which is divalent when other than nitrogen, i. e., a thiazolone, an oxazolone, an imidazolone, a pyrazolone, etc. for example, compounds such as rhodanines, a 2-thio-2,4 (3,5) oxazoledione nucleus, hydantoins and nitrogen-substituted derivatives, pyrazolones and thiopyrazolones; in addition X represents the non-metallic atoms necessary to complete a six-membered heterocyclic nucleus, for example, a six-membered heterocyclic nucleus containing two nuclear trivalent nitrogen atoms and four nuclear carbon atoms such as barbituric acids. The above-mentioned merocyanine dyes may then be convereted into more complex dyes by utilizing the quaternarization and condensation reactions described in British Patents 489,335 and 487,051.

Polymeric cyanine dyes from intermediates of the present invention may also be prepared particularly by the process of (Wilson) Ser. No. 409,433, now U. S. Patent 2,425,772. To be more specific the novel bases may be converted into dimeric quaternary salts and dye condensed in manners similar to those described in the working examples of that case.

In place of the specific ortho esters of carboxylic acids may be substituted any ester of this type which is capable of reacting with the heterocyclic nitrogen compounds. Suitable esters include trimethyl ortho-propionate, methyldiethyl n-caproate, methyl-diethyl ortho-isocaproate, trimethyl ortho-valerate, trimethyl ortho-formate, trimethyl ortho-benzoate, trimethyl ortho-p-toluene, trimethyl ortho-gamma-phenoxy-butyrate, trimethyl ortho-phenyl-acetate.

The novel alpha methyl thiazole containing an alpha furan nucleus substituent are new and useful compounds. They are useful chemical intermediates and are particularly useful as dye intermediates.

The novel cyanine dyes prepared from them have been found to have valuable sensitizing properties when used in conjunction with light sensitive photographic emulsion. They have been found to confer an extra range of sensitivity to light sensitive gelatino-silver halide emulsions imparting thereto unusual color sensitivity particularly in the green and red region of the spectrum. They are compatible with cyanine, pseudocyanine, carbocyanine cyazine and merocyanine dyes in general and may be admixed therewith to form novel emulsions. Moreover, they may be used in conjunction with immobile, or nondiffusing dye intermediates including color formers which are used in processes of color photography involving color coupling development steps and/or azo coupling steps. To be more specific they may be used with phenols, naphthols, pyrazolones, acylacetic acid esters and amides and the like such as those described in U. S. Patents: 2,166,181, 2,179,228, 2,179,234, 2,179,239, 2,186,734, 2,186,849, 2,294,909, 2,200,924 and 2,297,732 and in accordance with the processes described in such patents.

The dyes of the present invention are preferably dispersed in the emulsion which it is desired to sensitize or in a colloid layer immediately adjacent thereto. In general the dye is dissolved in some suitable solvent such as methanol, ethanol or acetone and added to the emulsion ready for pouring in a concentration of from 0.1 to 100 milligrams per liter of emulsion. The concentration of dye to be employed will vary according to the light-sensitive material and according to the particular dye. The most effective concentration will be readily determined by those skilled in the art according to known and customary procedures. For most dyes 10 to 50 milligrams per liter will be preferred although some dyes having long methine chains such as tri-, tetra and pentacarbocyanines may be used in much smaller quantities e. g. from 0.1 to 2 or more milligrams per liter. In addition to being employed in or adjacent to photographic layers the dyes of the invention may also be used to impart extra sensitivity by bathing films or plates in solutions of the dyes dissolved in suitable solvents. The present invention also embraces silver salts dyed with the dyes of the described type. Although the dyes have been described as being incorporated particularly in gelatino silver halide layers, carrier layers other than gelatin may be employed. For example light sensitive silver salts dispersed in collodion, water-swellable cellulose esters, ethers and synthetic resins, albuminous colloids, etc.

In addition to their use as sensitizing agents for silver halide emulsions, the dyes of the present invention may also be employed as screening or filter dyes in multilayer films or as antihalation dyes in backing layers.

The novel sensitizing dyes forming one aspect of this invention have advantages over known dyes in that silver halide containing the same have increased spectral sensitivity. Thiazolo cyanine type dyes have been known in the art for some time which contain alkyl or aryl substituents in the 4- and/or 5-position. A comparison has been made between the most closely analogous of these dyes and certain dyes of the present invention. All test films were prepared from portions of an ordinary gelatine iodobromide emulsion and equivalent concentrations of dyes were used in each case.

Table I gives the relative sensitivity values for a series of pseudocyanine dyes, the sensitivity of the pseudocyanine dye having a methyl substituent in the 4-position of the thiazole ring having been taken as 100. The exposures were made with white light and the relative sensitivity of the 3,3'-diethyl-4-4'-dimethylthiazolo carbocyanine iodide was taken as 100.

Table I

| Dye | Relative Sensitivity | Sensitizing Maximum | Sensitizing Range To— |
|---|---|---|---|
| | | Å. | Å. |
| 3:1'-diethyl-4-methyl-thiazolo pseudocyanine iodide | 100 | not definite | 5600 |
| 3:1'-diethyl-4-phenyl thiazolo pseudocyanine iodide | 250 | 5400 | 5900 |
| 3:1'-diethyl-4-phenyl-5-methyl-thiazolo pseudocyanine iodide | 160 | 5400 | 5700 |
| 3:1'-diethyl-4:5-diphenyl-thiazolo pseudo-cyanine iodide | 80 | 5500 | 5900 |
| 3:1'-diethyl-4-furyl-thiazolo pseudocyanine iodide | 400 | 5450 | 6000 |
| 3:1'-diethyl-4-benzofuryl-thiazolo pseudo-cyanine iodide | 550 | 5450 | 6100 |

Table II

| Dye | Relative Sensitivity | Sensitizing Maximum | Sensitizing Range To— |
|---|---|---|---|
| | | Å | Å |
| 3:3'-diethyl-4:4'-dimethyl-thiazolo carbocyanine iodide | 100 | 6000 | 6300 |
| 3:3'-diethyl-4:4'-diphenyl-thiazolo carbocyanine iodide | 300 | 6200 | 6800 |
| 3:3'-diethyl-4:4'-diphenyl-5:5'-dimethyl-thiazolo carbocyanine iodide | 25 | 6000 | 6200 |
| 3:3'-diethyl-4:4'-dinaphthyl-thiazolo carbocyanine iodide | 120 | 5800 | 6200 |
| 3:3'-diethyl-5:5'-dinaphthyl-thiazolo carbocyanine iodide | 140 | 5800 | 6200 |
| 3:3'-diethyl-4:4'-difuryl-thiazolo carbocyanine iodide | 500 | 6100 | 6600 |
| 3:3'-diethyl-4:4'-dibenz-furyl-thiazolo carbocyanine iodide | 410 | 6200 | 6800 |

As many apparently widely different embodiments of this invention may be made without departing from the spirit and scope thereof, it is to be understood that I do not limit myself to the specific embodiments hereof except as defined by the appended claims.

I claim:
1. A cyanine dye of the formula:

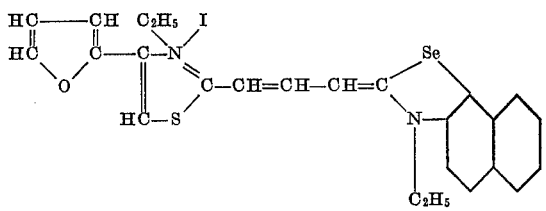

2. A cyanine dye of the formula:

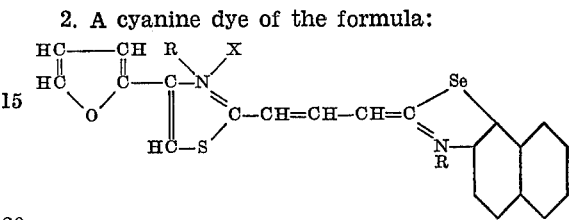

where R is an alkyl radical and X is the negative radical of an acid.

EDMUND B. MIDDLETON.

REFERENCES CITED

The following references are of record in the file of this patent:

UNITED STATES PATENTS

| Number | Name | Date |
|---|---|---|
| 2,060,383 | Schneider | Nov. 10, 1936 |
| 2,066,966 | Diterle | Jan. 5, 1937 |
| 2,083,804 | Zeh | June 15, 1937 |
| 2,089,322 | Zeh | Aug. 10, 1937 |
| 2,106,383 | Schneider | Jan. 25, 1938 |
| 2,170,804 | Brooker | Aug. 29, 1939 |
| 2,170,805 | Brooker | Aug. 29, 1939 |
| 2,170,806 | Brooker | Aug. 29, 1939 |
| 2,186,608 | Keyes | Jan. 9, 1940 |
| 2,201,816 | Middleton et al. | May 21, 1940 |
| 2,202,992 | Middleton et al. | June 4, 1940 |
| 2,216,441 | Keyes | Oct. 1, 1940 |
| 2,265,908 | Kendall | Dec. 9, 1941 |
| 2,277,409 | Murray | Mar. 24, 1942 |
| 2,278,461 | Middleton | Apr. 7, 1942 |
| 2,345,208 | Mathes | Mar. 28, 1944 |

OTHER REFERENCES

Richter, Organic Chemistry, vol. III (1923), pp. 12, 13 and 20. (Copy in Div. 64.)

Richter, "Chemie der Kohlenstoffmerbindingen, vol. III (1931), pp. 10, 11 and 19. (Copy in Div. 59.)